US009342136B2

United States Patent
Ping et al.

(10) Patent No.: US 9,342,136 B2
(45) Date of Patent: May 17, 2016

(54) DYNAMIC THERMAL BUDGET ALLOCATION FOR MULTI-PROCESSOR SYSTEMS

(71) Applicant: Samsung Electronics Co., Ltd., Suwon-si, Gyeonggi-do (KR)

(72) Inventors: Zhan Ping, San Jose, CA (US); Robert Brennan, Santa Clara, CA (US); Jason Martineau, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 182 days.

(21) Appl. No.: 14/292,785

(22) Filed: May 30, 2014

(65) Prior Publication Data

US 2015/0185814 A1     Jul. 2, 2015

Related U.S. Application Data

(60) Provisional application No. 61/921,465, filed on Dec. 28, 2013.

(51) Int. Cl.
*G06F 1/00* (2006.01)
*G06F 1/32* (2006.01)
*G06F 1/20* (2006.01)

(52) U.S. Cl.
CPC ............... *G06F 1/329* (2013.01); *G06F 1/206* (2013.01)

(58) Field of Classification Search
CPC ..................................... G06F 1/3203
USPC ......................................... 713/323
See application file for complete search history.

(56) References Cited

U.S. PATENT DOCUMENTS

| 7,035,785 | B2 * | 4/2006 | Grochowski et al. ........... 703/18 |
| 7,076,671 | B2 * | 7/2006 | Espinoza-Ibarra et al. ... 713/300 |
| 7,080,263 | B2 * | 7/2006 | Barr et al. ..................... 713/300 |
| 7,100,056 | B2 * | 8/2006 | Barr et al. ..................... 713/300 |
| 7,275,012 | B2 * | 9/2007 | Hermerding, II ............. 702/136 |
| 7,596,430 | B2 | 9/2009 | Aguilar et al. |
| 8,064,197 | B2 | 11/2011 | Mowry et al. |
| 8,140,868 | B2 | 3/2012 | Felter et al. |
| 8,284,205 | B2 * | 10/2012 | Miller et al. .................. 345/502 |
| 8,316,250 | B2 | 11/2012 | Trautman et al. |
| 8,332,679 | B2 | 12/2012 | Conroy et al. |
| 8,374,730 | B2 | 2/2013 | Conroy et al. |

(Continued)

OTHER PUBLICATIONS

Constantinou et al., "Performance Implications of Single Thread Migration on a Chip Multi-Core," (http://www.cs.ucy.ac.cy/carch/xi/papers/MigrationCAN.pdf).

(Continued)

*Primary Examiner* — Suresh Suryawanshi
(74) *Attorney, Agent, or Firm* — Renaissance IP Law Group LLP

(57) ABSTRACT

Embodiments of the present inventive concept relate to systems and methods for dynamically allocating and/or redistributing thermal budget to each processor from a total processor thermal budget based on the workload of each processor. In this manner, the processor(s) having a higher workload can receive a higher thermal budget. The allocation can be dynamically adjusted over time. The individual and overall processor performance increases while efficiently allocating the total thermal budget. By dynamically sharing the total thermal budget of the system, the performance of the system as a whole is increased, thereby lowering, for example, the total cost of ownership (TCO) of datacenters.

23 Claims, 8 Drawing Sheets

(56) References Cited

U.S. PATENT DOCUMENTS

| | | | |
|---|---|---|---|
| 8,386,808 B2* | 2/2013 | Therien et al. | 713/300 |
| 8,392,340 B2 | 3/2013 | Cox et al. | |
| 8,495,395 B2 | 7/2013 | Naffziger | |
| 8,769,316 B2* | 7/2014 | Ananthakrishnan et al. | 713/300 |
| 9,052,895 B2* | 6/2015 | Harchol-Balter et al. | |
| 9,063,727 B2* | 6/2015 | Man et al. | |
| 2010/0115293 A1 | 5/2010 | Rotem et al. | |
| 2010/0162006 A1 | 6/2010 | Therien et al. | |
| 2011/0138395 A1 | 6/2011 | Wolfe | |
| 2011/0191776 A1 | 8/2011 | Bose et al. | |
| 2013/0151191 A1 | 6/2013 | Ranieri et al. | |
| 2013/0159755 A1 | 6/2013 | Presant et al. | |
| 2013/0178999 A1 | 7/2013 | Geissler et al. | |
| 2013/0179704 A1 | 7/2013 | Ananthakrishnan et al. | |
| 2013/0185570 A1 | 7/2013 | Kumar et al. | |
| 2013/0226362 A1 | 8/2013 | Jagadishprasad et al. | |
| 2014/0181545 A1* | 6/2014 | Shrall et al. | 713/320 |
| 2014/0189301 A1* | 7/2014 | Gorbatov et al. | 712/30 |

OTHER PUBLICATIONS

Hung et al., "Thermal—Aware Floorplanning Using Genetic Algorithms," 2005 IEEE, Quality of Electronic Design, 2005. ISQED 2005. Sixth International Symposium, pp. 634,639, Mar. 21-23, 2005 doi:10.1109/ISQED.2005.122.

Liu et al., "Neighbor—Aware Dynamic Thermal Management for Multi-Core Platform," Design, Automation & Test in Europe Conference &Exhibition 2012, pp. 187-192, Mar. 12-16, 2012 doi:10.1109/DATE.2012.6176460.

Sheikh et al., "Fast Algorithms for Simultaneous Optimization of Performance, Energy and Temperature in DAG Scheduling on Multi-CoreProcessors," Proceedings of the International Conference on Parallel and Distributed Processing Techniques and Applications (PDPTA): 1-7. Athens:The Steering Committee of the World Congress in Computer Science, Computer Engineering and Applied Computing (WorldComp). (2012), Dec. 31, 2012.

Steinman, "Dynamic Power Management with Real-Time Thermal Calculations for Processors," APEC 2013, Advanced Micro Devices, Inc., Mar. 20, 2013, pp. 1-20, (http://www.apecconf.org/2013/images/PDF/2013/Industry_Sessions/is2.3.2.pdf).

Yeo et al., "Predictive Dynamic Thermal Management for Multicore Systems," Design Automation Conference, 2008. DAC 2008. 45th ACM/IEEE, pp. 734-739, Jun. 8-13, 2008.

Zhu et al., "Three-Dimensional Chip-Multiprocessor Run-Time Thermal Management," IEEE Transactions on Computer Aided Design of Integrated Circuits and Systems, vol. 27, No. 8, Aug. 2008, doi:10.1109/TCAD.2008.9 25793, pp. 1479-1492.

* cited by examiner

DYNAMIC THERMAL BUDGET ALLOCATION FOR MULTI-PROCESSOR SYSTEMS

RELATED APPLICATION DATA

This application claims the benefit of co-pending, commonly-owned U.S. Provisional Patent Application Ser. No. 61/921,465, filed Dec. 28, 2013, which is hereby incorporated by reference.

BACKGROUND

The present inventive concepts relate to multi-processor computer systems, and more particularly, to methods and systems for dynamically allocating thermal budgets for multi-processor systems.

Computers are used in myriad applications throughout the world. One trend in the computer space is the increase in the number of processors per system, particularly in computer server systems. In conventional multi-processor server systems, each processor has its own fixed fraction of a total thermal budget. Each processor evenly and equally shares the total thermal budget all of the time. The total thermal budget is based on worst cases predictions and evaluations. System designers design for worst case to reserve thermal budget for each processor. A fixed thermal budget, or thermal design power (TDP), plus a guard band, is used in attempts to ensure sufficient and stable operation.

But for most cases, the load on each processor is not evenly distributed. In other words, one processor might have a high load and may reach the thermal budget limit for its fraction of the total thermal budget, while another processor in the same system might have extra unused thermal budget. As a result, thermal budget is wasted and the dynamic performance of the server system is limited.

What is needed is a technique for dynamically redistributing the thermal budget to each processor from the total processor thermal budget based on the workload of each processor. Together with related inventive concepts disclosed herein, these and other limitations in the prior art are addressed.

BRIEF SUMMARY

Inventive concepts may include a method for dynamically allocating a thermal budget for a multi-processor system. The method may include detecting, using a first voltage regulator or other suitable measurement means, a first amount of current or power being consumed by a first processor, detecting, using a second voltage regulator or other suitable measurement means, a second amount of current or power being consumed by a second processor, determining, by dynamic thermal budget logic, power ratios associated with the first amount of current or power being consumed by the first processor and the second amount of current or power being consumed by the second processor, determining credits ratios based at least in part on the power ratios, allocating first thermal budget credits to the first processor in accordance with the credits ratios, and allocating second thermal budget credits to the second processor in accordance with the credits ratios. The credits ratios may be proportional to the power ratios. The detecting need not be performed using voltage regulators. For example, the detecting can use any suitable measurement means, such as a current detector or measurement means, an ohm detector or measurement device, a temperature sensor, a voltage detector or measurement device, or the like. By way of another example, the detecting can measure temperature rather than power. In some embodiments, power credits are used to dynamically allocate the thermal budget. In alternative embodiments, temperature credits can be used to dynamically allocate the thermal budget. In some embodiments, a single measurement unit (e.g., single voltage or power regulator) can be used for multiple processors.

The power ratios may be referred to as first power ratios, and the credits ratios may be referred to as first credits ratios. The method may further include after a predetermined short period of time: detecting, using the first voltage regulator, a third amount of current or power being consumed by the first processor, detecting, using the second voltage regulator, a fourth amount of current or power being consumed by the second processor, determining, by the dynamic thermal budget logic, second power ratios associated with the third amount of current or power being consumed by the first processor and the fourth amount of current or power being consumed by the second processor, determining second credits ratios based at least in part on the second power ratios, allocating third thermal budget credits to the first processor in accordance with the second credits ratios, and allocating fourth thermal budget credits to the second processor in accordance with the second credits ratios. The second credits ratios may be proportional to the second power ratios.

The method may further include predictively distributing the credits ratios and distributing heat across various physical locations of the multi-processor system according to the predictvely distributed credits ratios. The method may further include for a plurality of fixed periods of time, periodically repeating the detecting of the power being consumed by the first and second processors. The recalculation can be like a close loop control adjustment. The periodic repeating can also include repeating the determining by the dynamic thermal budget logic, the determining of the credits ratios, the allocating of the first thermal budget credits, and the allocating of the second thermal budget credits. Each of the plurality of fixed periods of time can be 20 microseconds or greater based on the evaluation.

Determining the power ratios may further include determining, by the dynamic thermal budget logic, a first processor power ratio associated with the first processor by dividing the amount of current or power being consumed by the first processor by a total amount of current or power being consumed by all processors associated with the thermal budget, and determining, by the dynamic thermal budget logic, a second processor power ratio associated with the second processor by dividing the amount of current or power being consumed by the second processor by a total amount of current or power being consumed by all processors associated with the thermal budget.

Determining the credits ratios may further include determining, by the dynamic thermal budget logic, a first processor credit ratio associated with the first processor based at least in part on the first processor power ratio, and determining, by the dynamic thermal budget logic, a second processor credit ratio associated with the second processor based at least in part on the second processor power ratio. The first processor credit ratio can be equal to the first processor power ratio. The second processor credit ratio can be equal to the second processor power ratio.

The method may further include controlling a temperature of the first processor to substantially remain within the thermal budget based at least on the first thermal budget credits allocated to the first processor, and controlling a temperature of the second processor to substantially remain within the thermal budget based at least on the second thermal budget credits allocated to the second processor.

The method may further include detecting, using a third voltage regulator, a third amount of current or power being consumed by a third processor, detecting, using a fourth voltage regulator, a fourth amount of current or power being consumed by a fourth processor, determining, by the dynamic thermal budget logic, the power ratios associated with the third amount of current or power being consumed by the third processor and the fourth amount of current or power being consumed by the fourth processor, allocating third thermal budget credits to the third processor in accordance with the credits ratios, and allocating fourth thermal budget credits to the fourth processor in accordance with the credits ratios. The method may further include resetting the thermal budget so that each processor is allocated a pre-determined quantity or fraction of the thermal budget, and re-allocating the thermal budget across the various processors according to the instant power consumption or temperature of each processor.

In some embodiments, a multi-processor system for dynamically allocating a thermal budget includes first measurement means configured to detect at least one of a first amount of current or power being consumed by a first processor, a second measurement means configured to detect at least one of a second amount of current or power being consumed by a second processor, and dynamic thermal budget logic communicatively coupled to the first measurement means, the second measurement means, the first processor, and the second processor.

The dynamic thermal budget logic can be configured to determine power ratios associated with the first amount of current or power being consumed by the first processor and the second amount of current or power being consumed by the second processor, and to determine credits ratios based at least in part on the power ratios.

The dynamic thermal budget logic can be configured to allocate first thermal budget credits to the first processor in accordance with the credits ratios, and to allocate second thermal budget credits to the second processor in accordance with the credits ratios. The credits ratios can be proportional to the power ratios.

The power ratios may be referred to as first power ratios, and the credits ratios may be referred to as first credits ratios. The first measurement means can be configured to detect at least one of a third amount of current or power being consumed by the first processor. The second measurement means can be configured to detect at least one of a fourth amount of current or power being consumed by the second processor. The dynamic thermal budget logic can be configured to determine second power ratios associated with the third amount of current or power being consumed by the first processor and the fourth amount of current or power being consumed by the second processor, and to determine second credits ratios based at least in part on the second power ratios.

The dynamic thermal budget logic can be configured to allocate third thermal budget credits to the first processor in accordance with the second credits ratios, the dynamic thermal budget logic is configured to allocate fourth thermal budget credits to the second processor in accordance with the second credits ratios. The second credits ratios can be proportional to the second power ratios.

The dynamic thermal budget logic can be configured to determine a first processor power ratio associated with the first processor by dividing the amount of current or power being consumed by the first processor by a total amount of current or power being consumed by all processors associated with the thermal budget. The dynamic thermal budget logic can be configured to determine a second processor power ratio associated with the second processor by dividing the amount of current or power being consumed by the second processor by a total amount of current or power being consumed by all processors associated with the thermal budget.

The dynamic thermal budget logic can be configured to determine a first processor credit ratio associated with the first processor based at least in part on the first processor power ratio. The dynamic thermal budget logic can be configured to determine a second processor credit ratio associated with the second processor based at least in part on the second processor power ratio. The first processor credit ratio may be equal to the first processor power ratio. The second processor credit ratio may be equal to the second processor power ratio.

The dynamic thermal budget logic can be configured to control a temperature of the first processor to substantially remain within the thermal budget based at least on the first thermal budget credits allocated to the first processor. The dynamic thermal budget logic can be configured to control a temperature of the second processor to substantially remain within the thermal budget based at least on the second thermal budget credits allocated to the second processor.

In some embodiments, third measurement means can be configured to detect at least one of a third amount of current or power being consumed by a third processor. In some embodiments, fourth measurement means can be configured to detect at least one of a fourth amount of current or power being consumed by a fourth processor. The dynamic thermal budget logic can be configured to determine the power ratios associated with the third amount of current or power being consumed by the third processor and the fourth amount of current or power being consumed by the fourth processor. The dynamic thermal budget logic can be configured to allocate third thermal budget credits to the third processor in accordance with the credits ratios. The dynamic thermal budget logic can be configured to allocate fourth thermal budget credits to the fourth processor in accordance with the credits ratios.

Certain of the inventive features may be best achieved by implementing them in a multi-processor system such as a computer server or desktop computer. Other types of processors and/or application specific integrated circuits (ASICs) can implement the inventive principles disclosed herein. The inventive concepts may be implemented within processors and/or memory modules of a variety of mobile devices such as smart phones, tablets, notebook computers, or the like, or in a variety of stationary devices such as desktop computers, routers, or the like.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first thermal budget could be termed a second thermal budget, and, similarly, a second thermal budget could be termed a first thermal budget, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the present inventive concept relate to systems and methods for dynamically allocating and/or redistributing thermal budget to each processor from a total processor thermal budget based on the workload of each processor. In this manner, the processor(s) having a higher workload can receive a higher thermal budget. The allocation can be dynamically adjusted over time. Thus, the individual and overall processor performance increases while efficiently allocating the total thermal budget. By dynamically sharing the total thermal budget of the system, the performance of the system as a whole is increased, thereby lowering, for example, the total cost of ownership (TCO) of datacenters.

Figure 1:
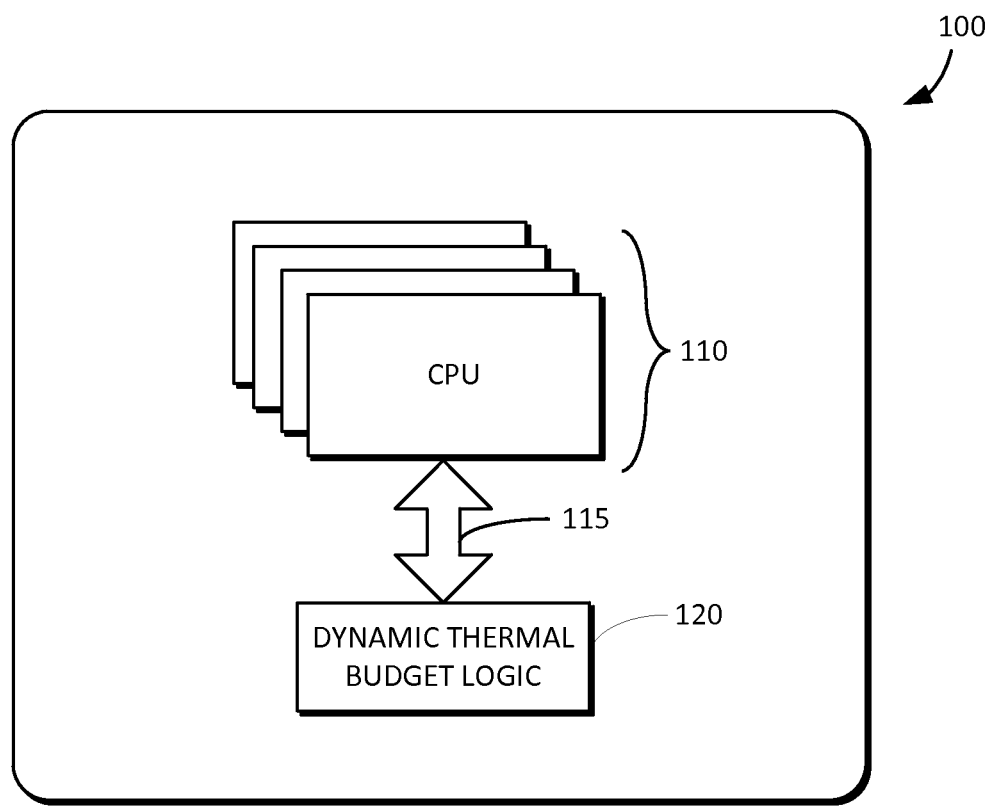
FIG. 1 is an example diagram of a system including multiple processors coupled to dynamic thermal budget logic in accordance with embodiments of the inventive concept.

FIG. 1 is an example diagram of a system 100 including multiple processors 110 (e.g., central processing units or CPUs) coupled to dynamic thermal budget logic 120 via one or more communication links 115 in accordance with embodiments of the inventive concept. The dynamic thermal budget logic 120 can coordinate the dynamic thermal budget allocation for each of the processors 110, as further described in detail below.

Figure 2A:
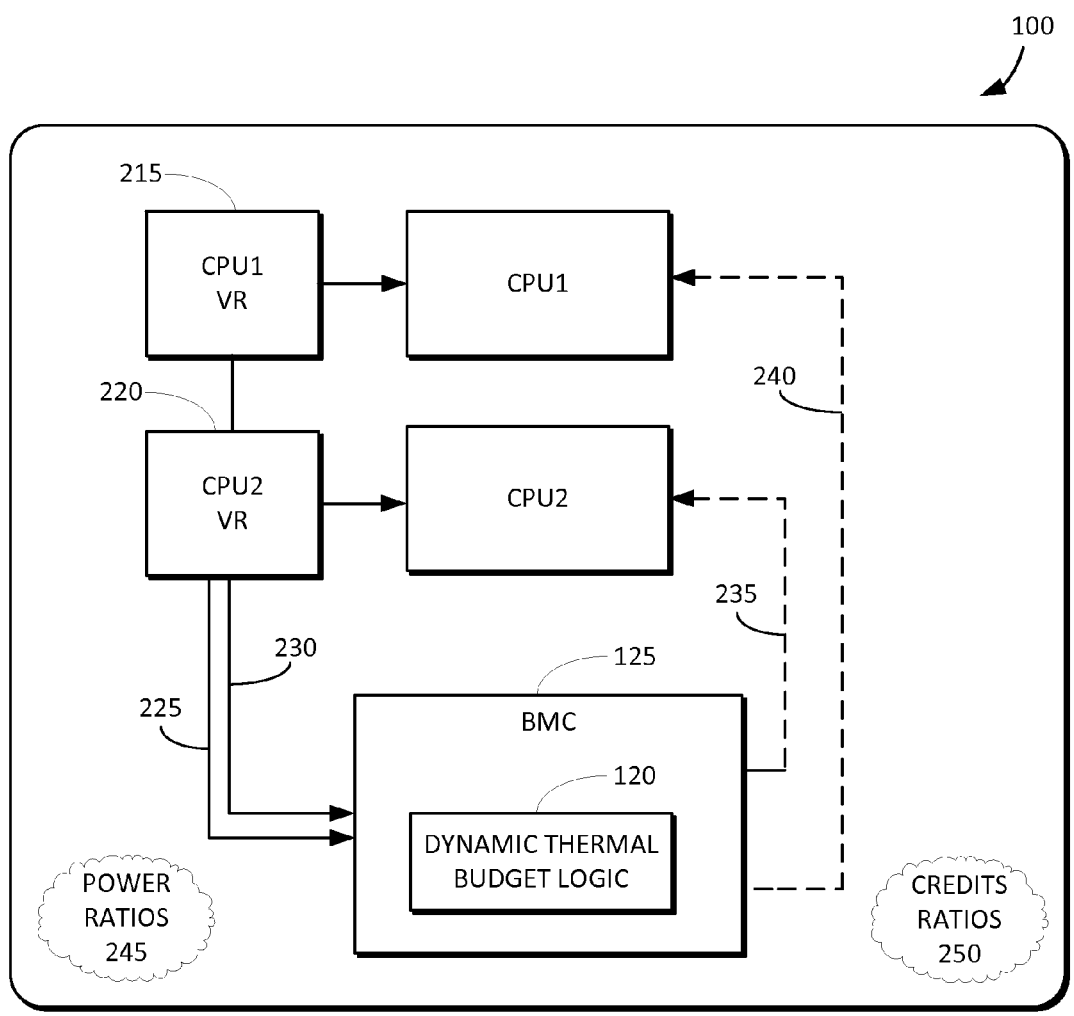
FIG. 2A is a more detailed example diagram of the system of FIG. 1 in accordance with embodiments of the inventive concept.

FIG. 2A is a more detailed example diagram of the system 100 of FIG. 1 in accordance with embodiments of the inventive concept. The system 100 may include, for example, a first processor CPU1 and a second processor CPU2. It will be understood that the system 100 may include 4, 8, 16, 32, or any suitable number of processors. Each processor may have associated therewith a voltage regulator (VR) controller. For example, a voltage regulator controller 215 may be coupled to and/or associated with the CPU1, and a voltage regulator controller 220 may be coupled to and/or associated with CPU2. Alternatively or in addition, a single VR can be associated with all of the processors. Alternatively or in addition, one or more temperature detectors (not shown) may be coupled to and/or associated with each CPU.

A baseboard management controller (e.g., BMC 125) may include the dynamic thermal budget logic 120. The BMC 125 may be coupled to voltage regulator controllers 215 and 220 via lines 225 and 230, respectively. The BMC 125 can sense the current and/or power from each voltage regulator controller to receive or otherwise determine the instant current consumption and/or power consumption information for each processor. Where the BMC 125 gets the current consumption information, it can calculate the power consumption from the current consumption information. The dynamic thermal budget logic 120 can receive and process the instant power consumption information. Based on the instant power consumption measurements for each processor, the dynamic thermal budget logic 120 can transmit credits to the processors (e.g., CPU1 and CPU2) via lines 240 and 235, respectively. The credits can be adjusted to be increased or decreased dynamically over time. The credits can be assigned, for example, every 20 microseconds (µs).

In other words, for every fixed period of time (e.g., 20 µs), the dynamic thermal budget logic 120 can detect and/or determine the instant power consumption of each processor, determine the number of credits for each processor, and allocate those credits so that the processors with relatively more processing activity receive a higher allocation of the overall thermal budget than the processors with relatively less processing activity. Each credit can represent some portion of the total allowable thermal budget. With a higher allocation of the thermal budget, those processors can operate at a higher power consumption level—higher than would typically be possible with conventional design techniques—and without causing the overall thermal budget to be exceeded. It will be understood that the period of time can be 20 µs or greater. It will also be understood that any suitable fixed period of time can be used.

The dynamic thermal budget logic 120 can determine one or more power ratios 245. Based on the power ratios 245, the dynamic thermal budget logic 120 can determine one or more credits ratios 250. The credits ratios 250 can be proportional to the power ratios 245. The power ratios 245 and credits ratios 250 are explained in further detail below.

More specifically, the voltage regulator controller 215 can detect a first amount of current and/or power being consumed by the CPU1, and the second voltage regulator 220 can detect a second amount of current and/or power being consumed by the CPU2. The dynamic thermal budget logic 120 is communicatively coupled to the first voltage regulator 215, the second voltage regulator 220, the CPU1, and the CPU2. The dynamic thermal budget logic 120 can determine power ratios associated with the first amount of current or power being consumed by the CPU1 and the second amount of current or power being consumed by the CPU2, and to determine credits ratios based at least in part on the power ratios.

For example, assume that the total thermal budget corresponds to 100 Watts (W) of CPU power. In other words, there can be a predetermined relationship between Watts and temperature, as further explained below. Further assume that CPU1 is currently consuming 60 W while CPU2 is currently consuming 20 W, for a total of 80 W that is currently being consumed by both processors. In this example, the power ratio for CPU1 is 3/4 (i.e., 60 W divided by 80 W) while the power ratio for CPU2 is 1/4 (i.e., 20 W divided by 80 W). The total thermal budget of 100 W can be divided among the various processors according to these ratios. For example, the credits ratios 250 can be 3/4 and 1/4, corresponding to the power ratios 245. Thus, 3/4 of the 100 W thermal budget, or thereabout, can be allocated as credits to the CPU1 while 1/4 of the 100 W thermal budget, or thereabout, can be allocated to the CPU2.

The dynamic thermal budget logic 120 can allocate first thermal budget credits 240 to the CPU1 in accordance with the credits ratios 250, and can allocate second thermal budget credits 235 to the CPU2 in accordance with the credits ratios 250. As mentioned above, the credits ratios 250 can be proportional and/or equal to the power ratios 245, but applied to the overall thermal budget to be allocated.

By unevenly allocating credits across the various processors, the system's behavior is impacted because each processor can operate at different load levels and still remain within an overall thermal budget. In other words, the thermal budget is tailored to the individual demands of each processor, while still keeping within the limitations of the system as a whole.

Figure 2B:
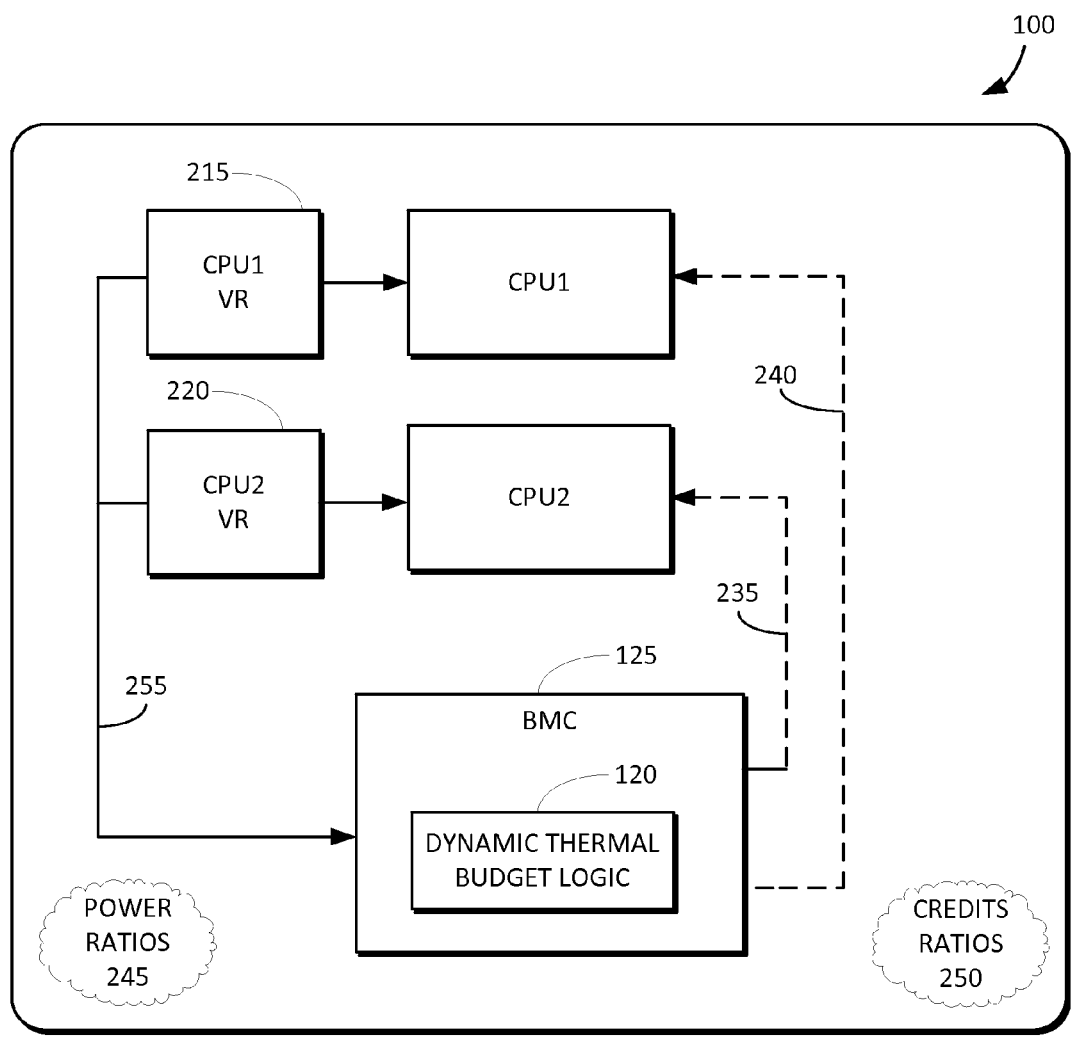
FIG. 2B is another more detailed example diagram of the system of FIG. 1 in accordance with embodiments of the inventive concept.

FIG. 2B is another detailed example diagram of the system 100 of FIG. 1 in accordance with embodiments of the inventive concept. The elements and lines are similar to the system of FIG. 2A with the notable difference that a single line 255 interconnects the voltage regulator controller 215, the voltage regulator 220, and the BMC 125. It will be understood that a single or multiple communications lines (e.g., wires, traces, and/or conductors) can be used. It will also be understood that a single or multiple voltage regulator controllers can be used. In other words, in some embodiments, a single voltage regulator controller may provide instant current and/or power consumption information to the BMC 125 for use by the dynamic thermal budget logic 120.

Figure 3:
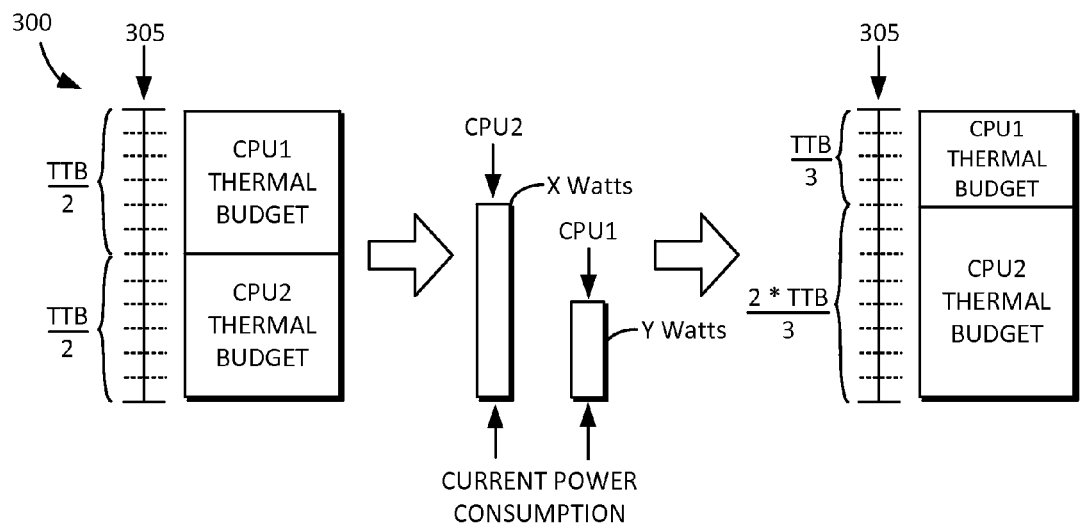
FIG. 3 is an example diagram of a technique for dynamically allocating thermal budget in accordance with embodiments of the inventive concept.

FIG. 3 is an example diagram of a technique for dynamically allocating thermal budget in accordance with embodiments of the inventive concept. The total thermal budget of the system can initially be evenly divided among the processors. For example, where there are two processors in the system, CPU1 may be initially allocated with half of the total thermal budget (i.e., TTB/2) while the CPU2 may be initially allocated with the other half of the total thermal budget (i.e., TTB/2). The credits 305 are therefore evenly divided, at least initially, among the CPU1 and the CPU2.

The instant power consumption can then be measured and/or determined. In this example, the CPU2 is currently consuming X Watts and the CPU1 is currently consuming Y Watts, and the total power being consumed is X+Y. By way of example, if X is 60 and Y is 30, then the total power currently being consumed by the CPU2 and the CPU1 is 90 W. The dynamic thermal budget logic 120 (of FIGS. 1, 2A, and 2B) can determine the power ratio for CPU2, which is 2/3 (i.e., 60/90), and can also determine the power ratio for CPU1, which is 1/3 (i.e., 30/90). The dynamic thermal budget logic 120 can then allocate 2/3 of the credits 305 to CPU2 and 1/3 of the credits 305 to CPU1, as shown in FIG. 3. The total number of credits 305 need not be equal to the total power being consumed by the processors. Nevertheless, the credits ratios can be proportional to the power ratios.

Figure 4:
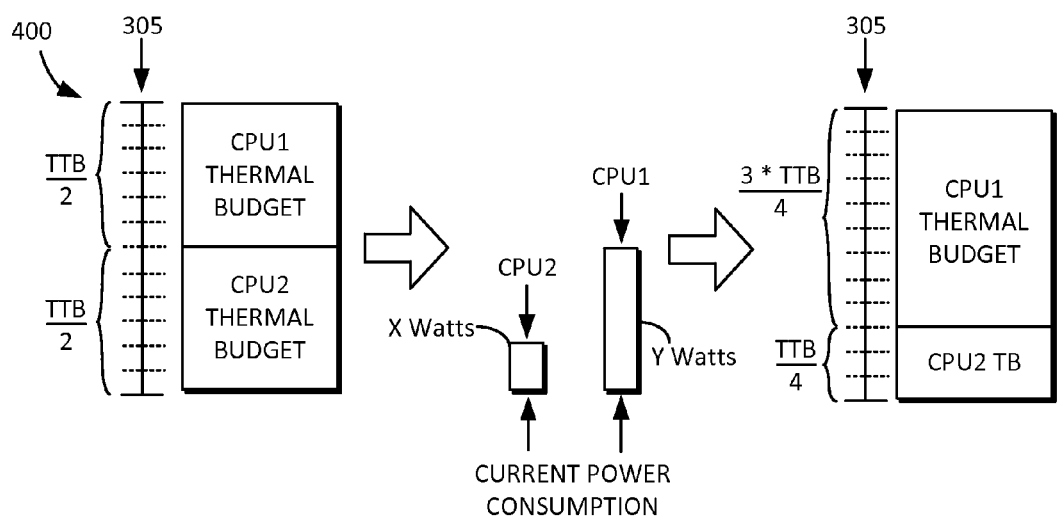
FIG. 4 is another example diagram of a technique for dynamically allocating thermal budget in accordance with embodiments of the inventive concept.

FIG. 4 is another example diagram 400 of a technique for dynamically allocating thermal budget in accordance with embodiments of the inventive concept. This example embodiment is similar to that discussed with reference to FIG. 3. The notable difference here is that the ratio between the power being consumed by CPU2 (X Watts) and the power being consumed by CPU1 (Y Watts) is different. That is, X is considerably less than Y in this example. Specifically, X divided by (X+Y) in this case is 1/4. In addition, Y divided by (X+Y) in this case is 3/4. These power ratios are also the credits ratios, which are applied to the credit allocation of credits 305. As a result, 3/4 of the total thermal budget is allocated to CPU1 and 1/4 of the total thermal budget is allocated to CPU2. It will be understood that X and Y can be any suitable numerical value or number of Watts. It will also be understood that there can be any suitable number of credits 305, which can be allocated in wholes or fractions of wholes.

Figure 5:
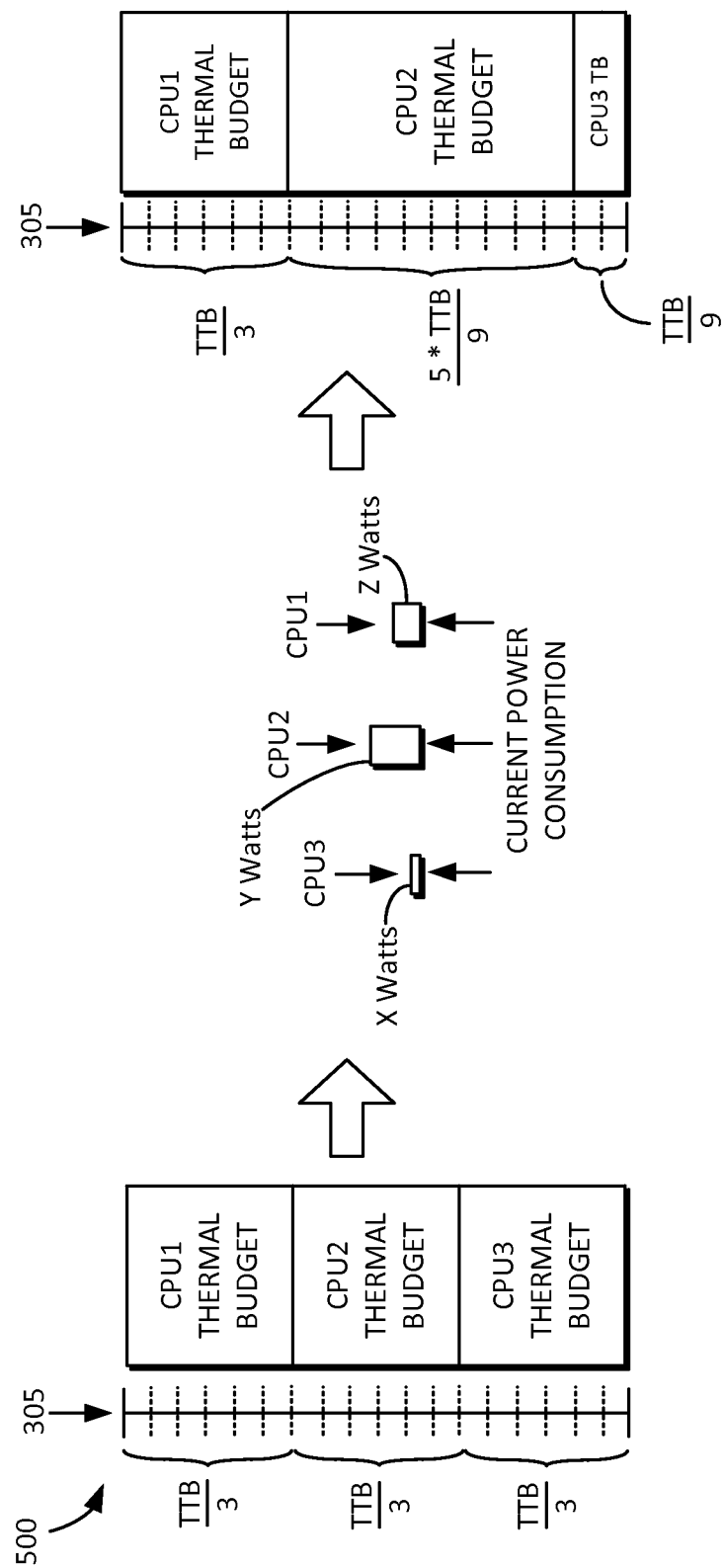
FIG. 5 is yet another example diagram of a technique for dynamically allocating thermal budget in accordance with embodiments of the inventive concept.

FIG. 5 is yet another example diagram 500 of a technique for dynamically allocating thermal budget in accordance with embodiments of the inventive concept. This example embodiment is similar to that discussed with reference to FIGS. 3 and 4. The notable difference here is the presence of three processors. It will be understood that 4, 6, 8, 16, 32, or more processors can be used, and still fall within the inventive concepts disclosed herein.

The total thermal budget may initially be divided evenly among the various processors so that, for example, CPU1 initially is allocated 1/3 of the total thermal budget, CPU2 is initially allocated 1/3 of the total thermal budget, and CPU3 is initially allocated 1/3 of the total thermal budget. After detecting the instant power consumption of each processor, the dynamic thermal budget logic 120 can determine the power ratios. For example, the power ratio for CPU3 in this example is X Watts/(X Watts+Y Watts+Z Watts). The power ratio for CPU2 in this example is Y Watts/(X Watts+Y Watts+Z Watts). The power ratio for CPU2 in this example is Z Watts/(X Watts+Y Watts+Z Watts). The values for X, Y, and Z can vary depending on the instant power consumption of each processor, but typically ranges between 10 Watts and 100 Watts. In this example, X may be 10, Y may be 50, and Z may be 30. Thus, in this example, the power ratio for CPU3 is 1/9 (i.e., 10/(10+50+30)), the power ratio for CPU2 is 5/9 (i.e., 50/(10+50+30)), and the power ratio for CPU3 is 1/3 (i.e., 30/(10+50+30)). The credits ratios can be determined based at least on the power ratios. The credits are then allocated to the various processors. For example, 1/9 of the credits 305 can be allocated to CPU3, 5/9 of the credits 305 can be allocated to CPU2, and 1/3 of the credits 305 can be allocated to CPU1.

Put differently, a first processor power ratio associated with the first processor can be determined by dividing the amount of current or power being consumed by the first processor by a total amount of current or power being consumed by all processors associated with the thermal budget. Similarly, a second processor power ratio associated with the second processor can be determined by dividing the amount of current or power being consumed by the second processor by a total amount of current or power being consumed by all processors associated with the thermal budget, and so forth for each processor. The temperatures of the first processor and the second processor can be controlled to substantially remain within the overall thermal budget based at least on the thermal budget credits allocated to the various processors.

By way of further explanation, if the current credit ratios are 1/9, 5/9, and 3/9, respectively, the ratios may remain unchanged on the next measurement if all of the CPUs are meeting their credit cap. In alternative embodiments, the credit ratios may gradually be returned toward an even credit distribution over time. Moreover, where a particular CPU may have been assigned a zero (0) value (e.g., for being shut off or otherwise not having any significant load or activity) for its fraction of the thermal budget, the particular CPU may be brought back into the overall thermal budget determination based on the system's current demand and load distribution, rather than solely based on the CPU's past use. In some embodiments, the dynamic thermal budget logic 120 can "reset" the total thermal budget by reverting the allocation to the initial state (or any other pre-defined state), e.g., divided evenly among the various processors so that, for example, CPU1 initially is allocated 1/3 of the total thermal budget, CPU2 is initially allocated 1/3 of the total thermal budget, and CPU3 is initially allocated 1/3 of the total thermal budget. In other words, the thermal budget can be reset so that each processor is allocated a same quantity or fraction of the total thermal budget. The dynamic thermal budget logic 120 can then proceed with re-allocating the thermal budget across the various CPUs according to the instant power consumption or temperature of each CPU.

Figure 6:
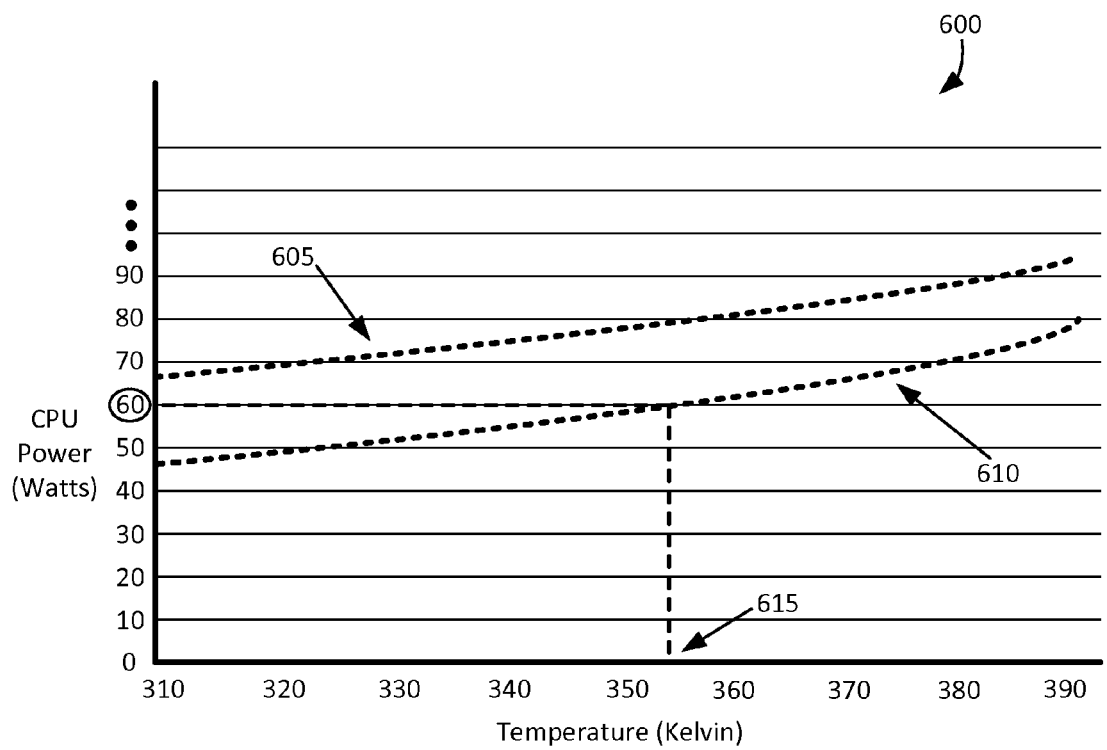
FIG. 6 is an example plot of power versus temperature of processors in accordance with embodiments of the inventive concept.

FIG. 6 is an example plot 600 of power versus temperature of processors in accordance with embodiments of the inventive concept. The X axis is representative of temperature and the Y axis is representative of power being consumed by a particular processor. Two different curves (e.g., 605 and 610) are representative of two different processors that operate at two different frequencies. This predetermined information can provide a relationship between CPU Watts and CPU temperature, and can be used to determine how many credits to dynamically allocate. The credits described above can take the form of "power" credits, even though temperature is the secondary result of allocating such power credits. In other words, if credits are allocated that are equivalent to 60 W, then based on predetermined information (such as this plot, which can be stored in table format, memory, on disk, etc.), the processor associated with the curve 610 is expected to operate at a temperature between 350 and 360 degrees Kelvin, or thereabout, as shown at 615. The dynamic thermal budget logic 120 can locate and use such predetermined information when calculating the total thermal budget and/or how many credits to transmit to each processor, relative to the total thermal budget available.

Figure 7:
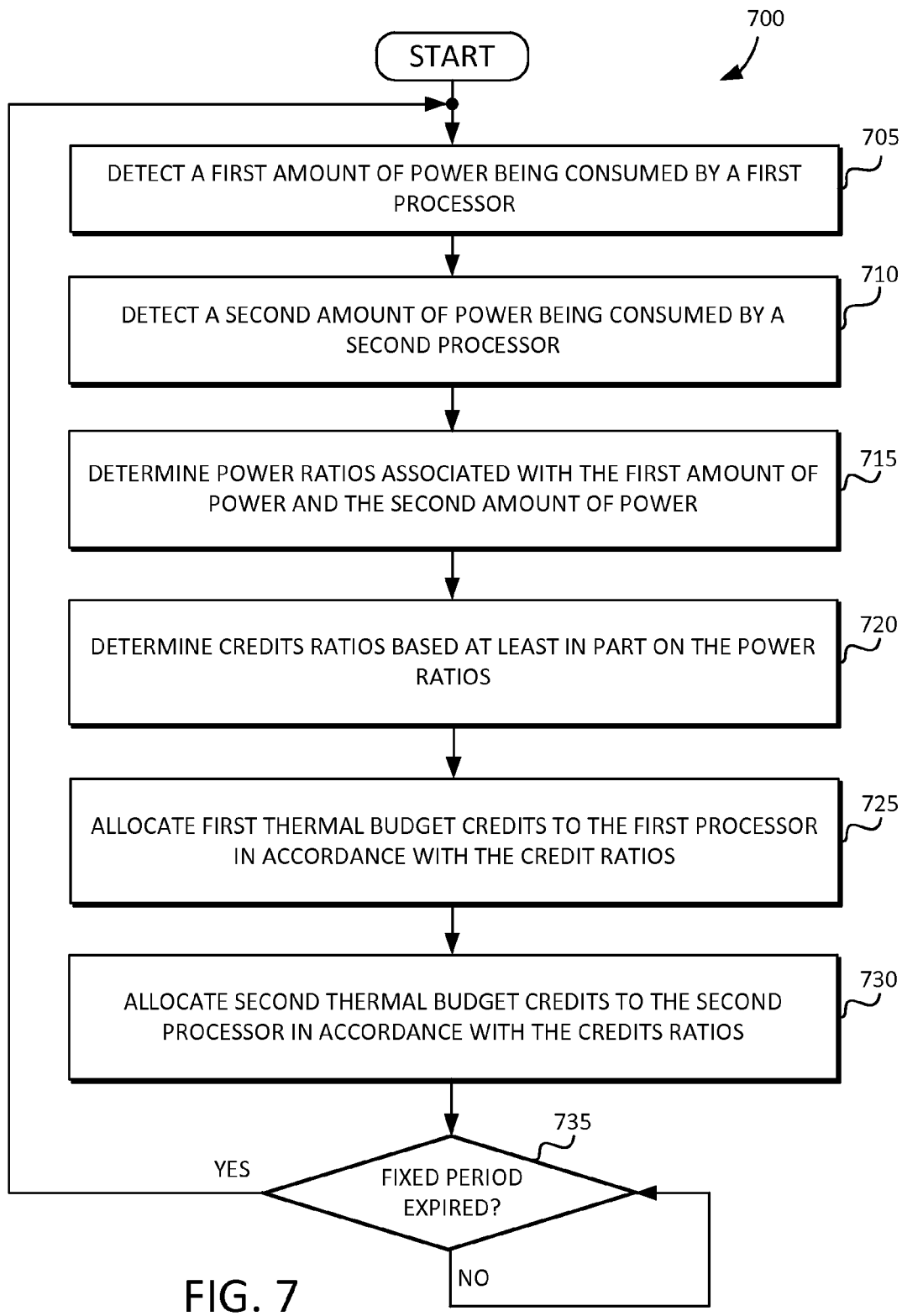
FIG. 7 is a flow diagram illustrating a technique for dynamically allocating thermal budget in a multi-processor system in accordance with embodiments of the inventive concept.

FIG. 7 is a flow diagram 700 illustrating a technique for dynamically allocating thermal budget in a multi-processor system in accordance with embodiments of the inventive concept. The technique begins at 705, where a first amount of current or power being consumed by a first processor is detected by a first voltage regulator controller. At 710, a second amount of current or power being consumed by a second processor can be detected by a second voltage regulator controller. The flow proceeds to 715, where the dynamic thermal budget logic can determine power ratios associated with the first amount of current or power being consumed by the first processor and the second amount of current or power being consumed by the second processor. At 720, credits ratios can be determined based at least in part on the power ratios. At 725, first thermal budget credits can be allocated to the first processor in accordance with the credits ratios. At 730, second thermal budget credits can be allocated to the second processor in accordance with the credits ratios.

The detecting need not be performed using voltage regulators. For example, the detecting can use any suitable measurement means. By way of another example, the detecting can measure temperature rather than power. In some embodiments, power credits are used to dynamically allocate the thermal budget. In alternative embodiments, temperature credits can be used to dynamically allocate the thermal budget. In some embodiments, a single measurement unit (e.g., single voltage or power regulator) can be used for multiple processors.

A determination can be made at 735 whether a fixed period has expired. If NO, the dynamic thermal budget logic can wait until the current period of time has elapsed. If YES, the flow returns to 705 for further measurements and allocations of credits so that the distribution of thermal budget credits to the various processors is dynamically changed over time.

The inventive concepts disclosed herein are not limited to linear configurations, but rather, can also be applied to non-linear configurations. In addition, the dynamic thermal budget allocation techniques can be based on profiles for dynamic thermal budget distribution. Moreover, neural networking or genetic techniques can be used to assist the dynamic credit allocation using self learning and optimization features. Such techniques can predictively distribute credit, and by knowing the location of governed processors, can distribute heat loads across various physical locations in a server.

Figure 8:
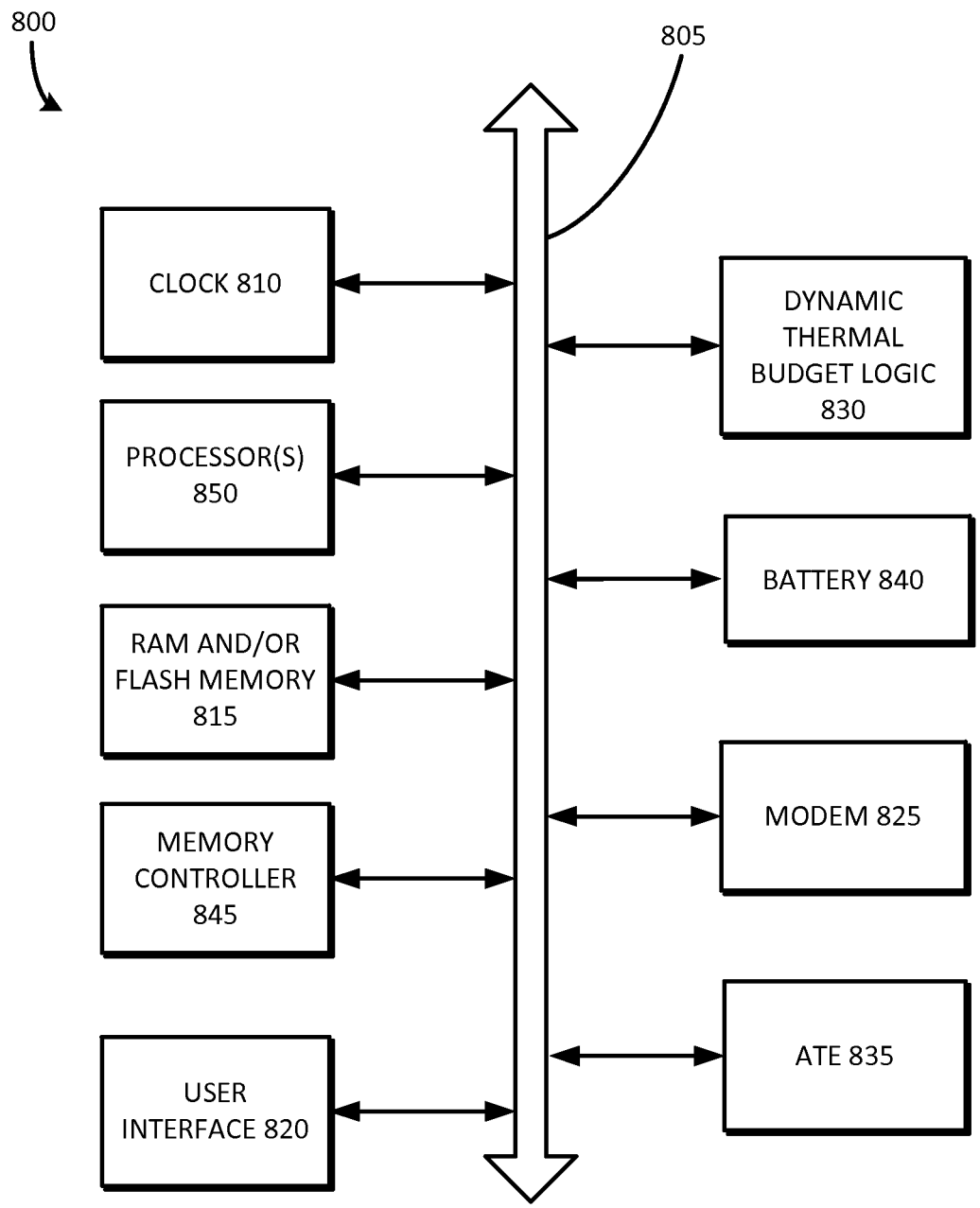
FIG. 8 is an example block diagram of a computing system including dynamic thermal budget logic according to embodiments of the inventive concept as disclosed herein.

FIG. 8 is an example block diagram of a computing system 800 including dynamic thermal budget logic 830 according to embodiments of the inventive concept as disclosed herein. The dynamic thermal budget logic 830 may be communicatively connected to a system bus 805. The computing system 800 may also include a clock 810, one or more processors 850, a random access memory (RAM) and/or flash memory 815, a memory controller 845, a user interface 820, a modem 825 such as a baseband chipset, and/or automated test equipment (ATE) 835, any or all of which may be electrically coupled to the system bus 805.

If the computing system 800 is a mobile device, it may further include a battery 840, which powers the computing system 800. Although not shown in FIG. 8, the computing system 800 may further include an application chipset, a camera image processor (CIS), a mobile DRAM, and the like. The memory controller 845 and the flash memory 815 may constitute a solid state drive/disk (SSD), which uses a non-volatile memory to store data.

In example embodiments, the computing system 800 may be used as computer, portable computer, Ultra Mobile PC (UMPC), workstation, net-book, PDA, web tablet, wireless phone, mobile phone, smart phone, e-book, PMP (portable multimedia player), digital camera, digital audio recorder/player, digital picture/video recorder/player, portable game machine, navigation system, black box, 3-dimensional television, a device capable of transmitting and receiving information at a wireless circumstance, one of various electronic devices constituting home network, one of various electronic devices constituting computer network, one of various electronic devices constituting a telematics network, RFID, or one of various electronic devices constituting a computing system.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A method for dynamically allocating a thermal budget for a multi-processor system, the method comprising:
    detecting a first amount of current or power being consumed by a first processor;
    detecting a second amount of current or power being consumed by a second processor;
    determining, by dynamic thermal budget logic, power ratios associated with the first amount of current or power being consumed by the first processor and the second amount of current or power being consumed by the second processor;
    determining credits ratios based at least in part on the power ratios;
    allocating first thermal budget credits to the first processor in accordance with the credits ratios; and
    allocating second thermal budget credits to the second processor in accordance with the credits ratios,
    wherein the credits ratios are proportional to the power ratios.

2. The method of claim 1, wherein the power ratios are referred to as first power ratios, and the credits ratios are referred to as first credits ratios, the method further comprising:
    after a predetermined period of time:
    detecting a third amount of current or power being consumed by the first processor;
    detecting a fourth amount of current or power being consumed by the second processor;
    determining, by the dynamic thermal budget logic, second power ratios associated with the third amount of current or power being consumed by the first processor and the fourth amount of current or power being consumed by the second processor;
    determining second credits ratios based at least in part on the second power ratios;
    allocating third thermal budget credits to the first processor in accordance with the second credits ratios; and
    allocating fourth thermal budget credits to the second processor in accordance with the second credits ratios,
    wherein the second credits ratios are proportional to the second power ratios.

3. The method of claim 1, further comprising:
    predictively distributing the credits ratios;
    distributing heat across various physical locations of the multi-processor system according to the predictively distributed credits ratios; and
    for a plurality of fixed periods of time, periodically repeating the detecting of the current or power being consumed by the first and second processors, the determining by the dynamic thermal budget logic, the determining of the credits ratios, the allocating of the first thermal budget credits, and the allocating of the second thermal budget credits.

4. The method of claim 3, wherein each of the plurality of fixed periods of time is 20 microseconds or greater.

5. The method of claim 1, wherein determining the power ratios further comprises:

determining, by the dynamic thermal budget logic, a first processor power ratio associated with the first processor by dividing the amount of current or power being consumed by the first processor by a total amount of current or power being consumed by all processors associated with the thermal budget; and determining, by the dynamic thermal budget logic, a second processor power ratio associated with the second processor by dividing the amount of current or power being consumed by the second processor by a total amount of current or power being consumed by all processors associated with the thermal budget.

6. The method of claim 5, wherein determining the credits ratios further comprises:

determining, by the dynamic thermal budget logic, a first processor credit ratio associated with the first processor based at least in part on the first processor power ratio; and determining, by the dynamic thermal budget logic, a second processor credit ratio associated with the second processor based at least in part on the second processor power ratio.

7. The method of claim 6, wherein:

the first processor credit ratio is equal to the first processor power ratio, and the second processor credit ratio is equal to the second processor power ratio.

8. The method of claim 6, further comprising:

controlling a temperature of the first processor to substantially remain within the thermal budget based at least on the first thermal budget credits allocated to the first processor; and controlling a temperature of the second processor to substantially remain within the thermal budget based at least on the second thermal budget credits allocated to the second processor.

9. The method of claim 1, further comprising:

detecting a third amount of current or power being consumed by a third processor;

detecting a fourth amount of current or power being consumed by a fourth processor;

determining, by the dynamic thermal budget logic, the power ratios associated with the third amount of current or power being consumed by the third processor and the fourth amount of current or power being consumed by the fourth processor;

allocating third thermal budget credits to the third processor in accordance with the credits ratios; and allocating fourth thermal budget credits to the fourth processor in accordance with the credits ratios.

10. The method of claim 1, further comprising:

resetting the thermal budget so that each processor is allocated a pre-determined quantity or fraction of the thermal budget; and re-allocating the thermal budget across the various processors according to the instant power consumption or temperature of each processor.

11. A multi-processor system for dynamically allocating a thermal budget, the system comprising:

first measurement means configured to detect at least one of a first amount of current or power being consumed by a first processor;

second measurement means configured to detect at least one of a second amount of current or power being consumed by a second processor; and dynamic thermal budget logic communicatively coupled to the first measurement means, the second measurement means, the first processor, and the second processor, wherein the dynamic thermal budget logic is configured to determine power ratios associated with the first amount of current or power being consumed by the first processor and the second amount of current or power being consumed by the second processor, and to determine credits ratios based at least in part on the power ratios, wherein the dynamic thermal budget logic is configured to allocate first thermal budget credits to the first processor in accordance with the credits ratios, and to allocate second thermal budget credits to the second processor in accordance with the credits ratios, and wherein the credits ratios are proportional to the power ratios.

12. The system of claim 11, wherein:

the power ratios are referred to as first power ratios, and the credits ratios are referred to as first credits ratios, the first measurement means is configured to detect at least one of a third amount of current or power being consumed by the first processor, the second measurement means is configured to detect at least one of a fourth amount of current or power being consumed by the second processor, the dynamic thermal budget logic is configured to determine second power ratios associated with the third amount of current or power being consumed by the first processor and the fourth amount of current or power being consumed by the second processor, and to determine second credits ratios based at least in part on the second power ratios, the dynamic thermal budget logic is configured to allocate third thermal budget credits to the first processor in accordance with the second credits ratios, the dynamic thermal budget logic is configured to allocate fourth thermal budget credits to the second processor in accordance with the second credits ratios, and the second credits ratios are proportional to the second power ratios.

13. The system of claim 11, wherein:

the dynamic thermal budget logic is configured to determine a first processor power ratio associated with the first processor by dividing the amount of current or power being consumed by the first processor by a total amount of current or power being consumed by all processors associated with the thermal budget, and the dynamic thermal budget logic is configured to determine a second processor power ratio associated with the second processor by dividing the amount of current or power being consumed by the second processor by a total amount of current or power being consumed by all processors associated with the thermal budget.

14. The system of claim 13, wherein:

the dynamic thermal budget logic is configured to determine a first processor credit ratio associated with the first processor based at least in part on the first processor power ratio, and the dynamic thermal budget logic is configured to determine a second processor credit ratio associated with the second processor based at least in part on the second processor power ratio.

15. The system of claim 14, wherein:

the first processor credit ratio is equal to the first processor power ratio, and the second processor credit ratio is equal to the second processor power ratio.

16. The system of claim 14, wherein:
the dynamic thermal budget logic is configured to control a temperature of the first processor to substantially remain within the thermal budget based at least on the first thermal budget credits allocated to the first processor, and
the dynamic thermal budget logic is configured to control a temperature of the second processor to substantially remain within the thermal budget based at least on the second thermal budget credits allocated to the second processor.

17. The system of claim 11, further comprising:
third measurement means configured to detect at least one of a third amount of current or power being consumed by a third processor; and
fourth measurement means configured to detect at least one of a fourth amount of current or power being consumed by a fourth processor,
wherein the dynamic thermal budget logic is configured to determine the power ratios associated with the third amount of current or power being consumed by the third processor and the fourth amount of current or power being consumed by the fourth processor,
wherein the dynamic thermal budget logic is configured to allocate third thermal budget credits to the third processor in accordance with the credits ratios, and
wherein the dynamic thermal budget logic is configured to allocate fourth thermal budget credits to the fourth processor in accordance with the credits ratios.

18. The system of claim 11, wherein:
the dynamic thermal budget logic is configured to predictively distribute the credits ratios,
the dynamic thermal budget logic is configured to distribute heat across various physical locations of the multi-processor system according to the predictively distributed credits ratios, and
the dynamic thermal budget logic is configured to, for a plurality of fixed periods of time, periodically repeat the detecting of the current or power being consumed by the first and second processors, the determining by the dynamic thermal budget logic, the determining of the credits ratios, the allocating of the first thermal budget credits, and the allocating of the second thermal budget credits.

19. The system of claim 11, wherein:
the dynamic thermal budget logic is configured to reset the thermal budget so that each processor is allocated a pre-determined quantity or fraction of the thermal budget; and
re-allocate the thermal budget across the various processors according to the instant power consumption or temperature of each processor.

20. A system, comprising:
a bus;
a plurality of processors communicatively coupled to the bus;
dynamic thermal budget logic communicatively coupled to the bus and to the one or more processors;
first measurement means configured to detect at least one of a first amount of current or power being consumed by a first processor from among the plurality of processors; and
second measurement means configured to detect at least one of a second amount of current or power being consumed by a second processor from among the plurality of processors, and
wherein the dynamic thermal budget logic is configured to determine power ratios associated with the first amount of current or power being consumed by the first processor and the second amount of current or power being consumed by the second processor, and to determine credits ratios based at least in part on the power ratios,
wherein the dynamic thermal budget logic is configured to allocate first thermal budget credits to the first processor in accordance with the credits ratios, and to allocate second thermal budget credits to the second processor in accordance with the credits ratios, and
wherein the credits ratios are proportional to the power ratios.

21. The system of claim 20, wherein:
the power ratios are referred to as first power ratios, and the credits ratios are referred to as first credits ratios,
the first measurement means is configured to detect at least one of a third amount of current or power being consumed by the first processor,
the second measurement means is configured to detect at least one of a fourth amount of current or power being consumed by the second processor,
the dynamic thermal budget logic is configured to determine second power ratios associated with the third amount of current or power being consumed by the first processor and the fourth amount of current or power being consumed by the second processor, and to determine second credits ratios based at least in part on the second power ratios,
the dynamic thermal budget logic is configured to allocate third thermal budget credits to the first processor in accordance with the second credits ratios,
the dynamic thermal budget logic is configured to allocate fourth thermal budget credits to the second processor in accordance with the second credits ratios, and
the second credits ratios are proportional to the second power ratios.

22. The system of claim 20, wherein:
the dynamic thermal budget logic is configured to determine a first processor power ratio associated with the first processor by dividing the amount of current or power being consumed by the first processor by a total amount of current or power being consumed by all processors associated with the thermal budget, and
the dynamic thermal budget logic is configured to determine a second processor power ratio associated with the second processor by dividing the amount of current or power being consumed by the second processor by a total amount of current or power being consumed by all processors associated with the thermal budget.

23. The system of claim 22, wherein:
the dynamic thermal budget logic is configured to determine a first processor credit ratio associated with the first processor based at least in part on the first processor power ratio, and
the dynamic thermal budget logic is configured to determine a second processor credit ratio associated with the second processor based at least in part on the second processor power ratio.

* * * * *